United States Patent [19]
Bauer et al.

[11] Patent Number: 5,668,260
[45] Date of Patent: Sep. 16, 1997

[54] TETRAKISAZO COMPOUNDS, THE METHOD OF PREPARATION THEREOF AND THE PROCESS OF PYEING

[75] Inventors: Wolfgang Bauer, Maintal; Dieter Baumgart, Egelsbach; Walter Zöller, Klingenberg, all of Germany

[73] Assignee: Hoecht Aktienge Sellschaft, Frankfurt, Germany

[21] Appl. No.: 637,322

[22] Filed: Apr. 22, 1996

[30] Foreign Application Priority Data

Apr. 22, 1995 [DE] Germany .................. 195 14 880.0

[51] Int. Cl.$^6$ .................. C09B 35/56; D06P 1/06; D06P 1/39; D06P 3/06; D06P 3/60
[52] U.S. Cl. .................. 534/806; 106/31.52
[58] Field of Search .................. 534/806; 106/22 R, 106/23 R

[56] References Cited

U.S. PATENT DOCUMENTS

| | | | |
|---|---|---|---|
| 1,363,886 | 12/1920 | Leaming et al. | 534/806 X |
| 2,958,689 | 11/1960 | Byland et al. | 534/806 X |
| 4,279,814 | 7/1981 | Smith | 534/806 X |
| 4,285,860 | 8/1981 | Hansen et al. | 534/806 X |
| 4,395,388 | 7/1983 | Eida et al. | 534/806 X |
| 4,426,226 | 1/1984 | Ohta et al. | 106/22 |
| 5,530,105 | 6/1996 | Yamazaki et al. | 534/678 |

FOREIGN PATENT DOCUMENTS

| | | | |
|---|---|---|---|
| 2230756 | 1/1974 | Germany | 534/806 |
| 2244991 | 3/1974 | Germany | 534/806 |
| 2913720 | 10/1980 | Germany | 534/806 |
| A-2913720 | 2/1983 | Germany | 534/806 X |
| 1808844 | 4/1993 | U.S.S.R. | 534/806 |
| 1895-7969 | 2/1896 | United Kingdom | 534/806 |
| 0602254 | 5/1948 | United Kingdom | 534/806 |

OTHER PUBLICATIONS 1-167,703 Jul. 1989 Japan Mitsubishi.

*Primary Examiner*—Floyd D. Higel
*Attorney, Agent, or Firm*—Connolly & Hutz

[57] ABSTRACT

The present invention relates to tetrakisazo dyes of the general formula I

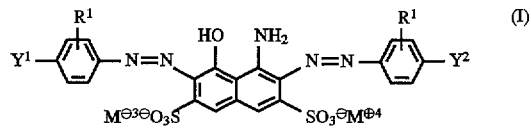

in which

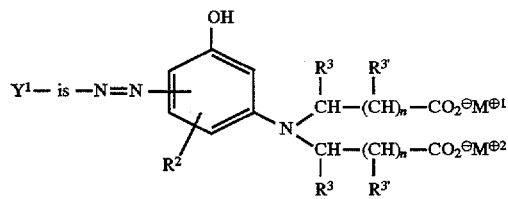

and

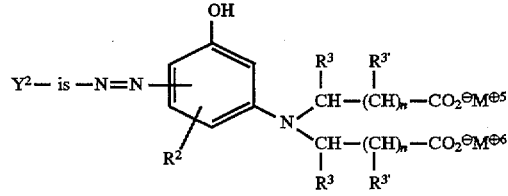

and $R^1$, $R^2$, $R^3$, $M^{\oplus 1}$ to $M^{\oplus 1}$ and n are as defined in Claim 1, to processes for their preparation and to their use.

19 Claims, No Drawings

TETRAKISAZO COMPOUNDS, THE METHOD OF PREPARATION THEREOF AND THE PROCESS OF PYEING

The present invention relates to novel tetrakisazo compounds of the general formula I,

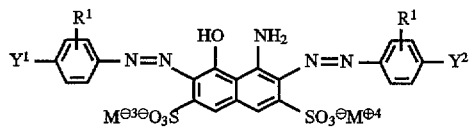

in which

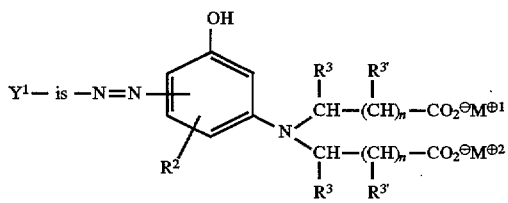

and

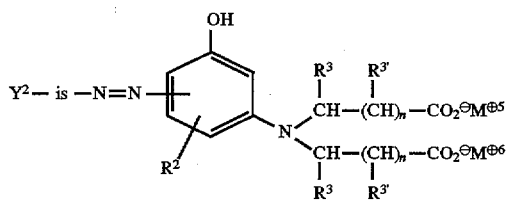

to their preparation and their use as dyes, especially in inks and in recording liquids for the ink-jet printing method, and to such recording liquids.

Inks, writing liquids, marking liquids, in general recording liquids, consist in principle of one or more soluble dyes which are dissolved in a solvent, for example water, or in a solvent mixture. In general, the solution additionally contains auxiliaries, such as surface-active substances, humectants and preservatives, for example. Particular requirements are made of those recording liquids which are to be used in the ink-jet printing method, a contactless printing method in which droplets of the recording liquid are sprayed from one or more nozzles onto the substrate to be printed. In order to obtain prints of high quality, i.e. of high definition and clarity, the recording liquid has to meet certain requirements in respect of purity, freedom from particles, viscosity, surface-tension or corrosiveness, which leads in turn to particular requirements on the properties of the dyes which are used to produce the recording liquid. For example, the dyes must in particular be of high solubility, so that there is no deposition of precipitates or no encrustation at the nozzle. In addition, however, the dyes should of course also be as tinctorially strong as possible and should have high-grade fastness properties, so as to give prints of good integrity.

Tetrakisazo compounds of the general formula II

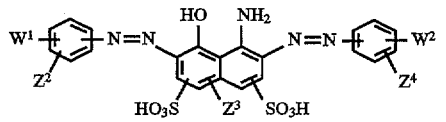

in which

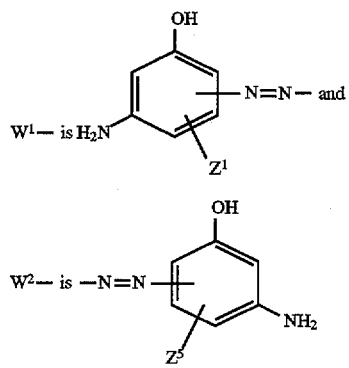

and in which the radicals $Z^1$ to $Z^5$ on the aromatic rings can have different meanings, and the corresponding salts, and their use for colouring various materials, and also their use as dyes in recording liquids for the ink-jet printing method, are known; see, for example, DE-C-32 39 026, DE-C-32 24 660, DE-A-30 23 417, DE-A-29 48 309, DE-A-29 27 062, DE-A-29 13 720, DE-A-22 44 991, JP-A-58 113 272, JP-A-63 278 891, JP-A-63 309 568, JP-A-63 317 570.

However, recording liquids for ink-jet printing methods comprising, in accordance with the prior art, dyes of the general formula II, have a number of disadvantages; for example, their stability on storage is in many cases inadequate, and can lead to deposition of dye crystals, to blockage of nozzles and to printed images which lack definition, and they have inadequate fastness properties, in particular inadequate water fastness, especially on weakly acidic grades of paper. There thus continues to be a need for recording liquids, and for dyes suitable for such liquids, which have an improved profile of properties.

Surprisingly it has now been found that the above-mentioned disadvantages of the dyes of the general formula II and of the recording liquids in which they are present no longer exist if, rather than amino groups, the two terminal phenyl radicals, i.e. in the groups $W^1$ and $W^2$, in the general formula II carry N,N-bis (carboxyalkyl)amino groups. Dyes of this kind have distinct advantages in respect of their dyeing properties, and inks and recording liquids produced from soluble dyes which carry such groups are of outstanding stability on storage and produce printed images of excellent quality which possess not only high definition and brightness but also very good fastness properties.

The present invention relates accordingly to novel tetrakisazo compounds of the general formula I

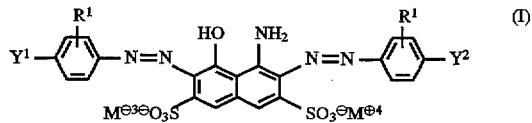

in which

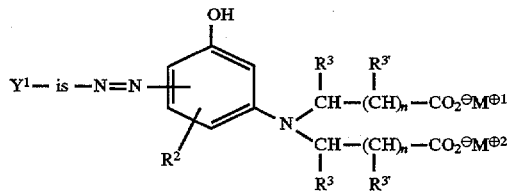

and

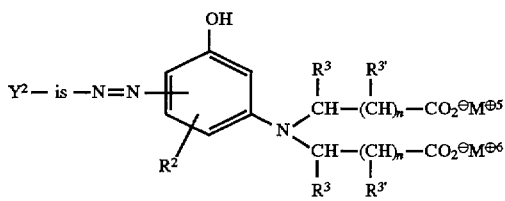

and $R^1$ is hydrogen or $(C_1-C_4)$-alkyl;

$R^2$ is hydrogen, $(C_1-C_4)$-alkyl or halogen;

$R^3$ and $R^{3'}$ independently of one another are hydrogen or $(C_1-C_4)$-alkyl;

$M^{\oplus 1}$, $M^{\oplus 2}$, $M^{\oplus 3}$, $M^{\oplus 4}$, $M^{\oplus 5}$ and $M^{\oplus 6}$ independently of one another are a cation; and n is 0 or 1.

The compounds of the general formula I can be present both as individual substances and as mixtures. $(C_1-C_4)$-alkyl is, for example, methyl, ethyl, n-propyl, isopropyl, n-butyl, isobutyl, sec-butyl or tert-butyl, methyl being preferred.

Halogen is, for example, fluorine, chlorine, bromine or iodine, chlorine being preferred.

Each of the cations $M^{\oplus 1}$ to $M^{\oplus 6}$ can be an ion carrying a single positive charge or can be one equivalent of an ion carrying a double or multiple positive charge. A cation $M^{\oplus 1}$ to $M^{\oplus 6}$ can be inorganic or organic.

In this respect, particularly suitable inorganic cations are alkali metal and alkaline earth metal ions and the ammonium ion, and also the hydrogen ion. Where one or more or all of the cations $M^{\oplus 1}$ to $M^{\oplus 6}$ are the hydrogen ion, the compounds of the general formula I and the respective carboxylate and/or sulphonate groups are in the form of the free acids, and not of salts. Examples of alkali metal ions are the lithium, sodium, potassium, rubidium and caesium ion, and examples of alkaline earth metal ions are the magnesium, calcium, strontium and barium ion. Preferred inorganic cations, other than the hydrogen ion, are alkali metal ions and the ammonium ion. Particular preference is given to the lithium, sodium, potassium and ammonium ion, which are particularly advantageous when water-soluble compounds of the general formula I are required. Among inorganic cations, very particular preference is given to those of lithium and sodium.

Suitable organic cations which are possibilities for $M^{\oplus 1}$ to $M^{\oplus 6}$ are, in particular, ammonium ions, cations derived from nitrogen heterocycles, and quaternary phosphonium ions. The ammonium ions may be primary, secondary, tertiary and quaternary ammonium ions, and the organic radicals present therein, for example alkyl, alkenyl, aryl or aralkyl radicals, can be identical or different and can be unsubstituted or substituted. The ammonium ions can also be derived from compounds having two or more amino functions, for example from diamines or triamines. In this case all, some or only one of the amino functions can be in ammonium ion form, and thus multiply charged ammonium ions can also be present. Nitrogen heterocycles from which suitable cations are derived can be aromatic, partially unsaturated or saturated and can contain, in addition to the positively charged nitrogen atom or atoms, further heteroatoms, for example uncharged nitrogen atoms or oxygen atoms. Examples of nitrogen heterocycles are pyrrolidine, piperidine, piperazine or morpholine, all of which can also be substituted on the nitrogen, and pyridine or imidazole. The cations can be derived from the hetero-cycles formally, by addition of a proton or of a substituted or unsubstituted alkyl radical.

Preferred organic cations $M^{\oplus 1}$ to $M^{\oplus 6}$ are, on the one hand, organic ammonium ions of the general formula III $$R^7-\overset{R^4}{\underset{R^6}{N^{\oplus}}}-R^5 \qquad (III)$$

in which $R^4$, $R^5$, $R^6$ and $R^7$ independently of one another are hydrogen, unsubstituted $(C_1-C_4)$-alkyl or $(C_1-C_4)$-alkyl which is substituted by one or more hydroxy or 2-hydroxyethoxy groups. Cations $M^{\oplus 1}$ to $M^{\oplus 6}$ of the general formula III are particularly advantageous when water-soluble tetrakisazo compounds of the general formula I are required. Here too, the alkyl radicals are subject to the explanations given above. In the case of substituted alkyl radicals $R^4$ to $R^7$, particular preference is given to those having a hydroxy or 2-hydroxyethoxy substituent.

Preferred organic cations $M^{\oplus 1}$ to $M^{\oplus 6}$ are also, on the other hand, ammonium ions of the general formula IV $$R^8-N^{\oplus}H_3 \qquad (IV)$$

in which $R^8$ is straight-chain or branched $(C_6-C_{16})$-alkyl in which, in addition, an oxygen atom can also be inserted between two carbon atoms.

Examples of possible radicals $R^8$ are n-hexyl, isoheptyl, n-octyl, isooctyl, tert-octyl, 2-ethylhexyl, 1,1,3,3-tetramethylbutyl, 1,5-dimethylhexyl, 1-methylheptyl, n-nonyl, isononyl, 3,5,5-trimethylhexyl, n-decyl, n-dodecyl, isododecyl, hexadecyl, 3-(2-ethylhexyloxy)-propyl and 3-isononyloxypropyl.

Cations $M^{\oplus 1}$ to $M^{\oplus 6}$ of the general formula IV are particularly advantageous when alcohol-soluble tetrakisazo compounds of the general formula I are required. It is particularly preferred for $R^8$ to be a straight-chain or branched $(C_8-C_{12})$-alkyl in which, in addition, an oxygen atom can also be inserted between two carbon atoms.

The cations $M^{\oplus 1}$ to $M^{\oplus 6}$ can in any case all be identical, identical in some cases or all different, irrespective of whether they are organic or inorganic cations. It is also possible, in the compounds of the general formula I, for inorganic or organic cations to exist alongside one another. The selection of the cations depends on the intended use of the compounds. In a preferred form of the present invention, the cations $M^{\oplus 1}$ to $M^{\oplus 6}$ are all identical, or some of the cations $M^{\oplus 1}$ to $M^{\oplus 6}$ are all one cation and the remainder of the cations $M^{\oplus 1}$ to $M^{\oplus 6}$ are all another cation. For example, it is possible—and may also be a result, for example, of the prevailing pH—for some of the cations $M^{\oplus 1}$ to $M^{\oplus 6}$ to be the hydrogen ion and for all of the remainder to have a particular, different meaning.

$R^1$ is preferably hydrogen.

$R^2$ is preferably hydrogen.

$R^3$ and $R^{3'}$ independently of one another are preferably hydrogen or methyl.

n is preferably 0.

In preferred tetrakisazo compounds of the general formula I, one or more of the groups $R^1$, $R^2$, $R^3$ and $R^{3'}$ and/or one or more of the cations $M^{\oplus 1}$ to $M^{\oplus 6}$ and/or the number n have the respective preferred meanings. Particularly preferred tetrakisazo compounds of the general formula I are those in which $R^1$ and $R^2$ are hydrogen and $R^3$ and $R^{3'}$ independently of one another are hydrogen or methyl. Very particular preference is given to those tetrakisazo compounds of the general formula I in which $R^1$, $R^2$ and $R^3$ are hydrogen, n is 0 and the cations $M^{\oplus 1}$ to $M^{\oplus 6}$ are identical.

Over and above this, it is preferred—when water-soluble tetrakisazo dyes of the general formula I are required—for the cations $M^{\oplus 1}$ to $M^{\oplus 6}$ to be the lithium, sodium, potassium or ammonium ion or an organic ammonium ion of the general formula III, and—when alcohol-soluble tetrakisazo dyes of the general formula I are required—for the cations $M^{\oplus 1}$ to $M^{\oplus 6}$ to be an organic ammonium ion of the general formula IV.

The compounds of the general formula I can be prepared by bis-diazotization of the terminal amino groups of a bisazo compound of the general formula V

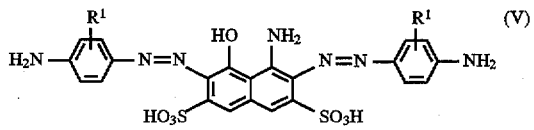

in which $R^1$ has the meanings given above, which is a known process, under customary conditions, for example using sodium nitrite/acid, and coupling the resulting bisdiazonium salt of the general formula VI

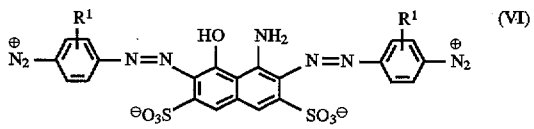

onto an N-(3-hydroxyphenyl)iminodiacetic acid derivative or N-(3-hydroxyphenyl)iminodipropionic acid derivative of the general formula VII

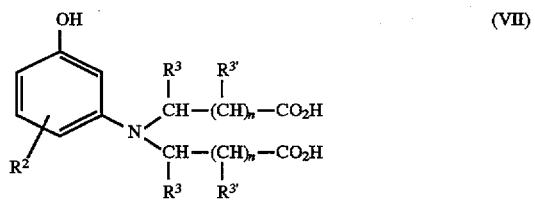

in which $R^3$ and $R^{3'}$ and n have the meanings given above, or a salt thereof. The coupling reaction is preferably carried out in an aqueous reaction medium at a pH of from 5 to 12, particularly preferably at a pH of from 7 to 10. The coupling temperature is in general from −5° to 30° C., preferably from 0° to 10° C. Provided a position is not blocked by the substituent $R^2$, coupling can take place both para to the hydroxyl group and para to the disubstituted amino group of the compound of the general formula VII. In such cases, the compounds of the general formula I are therefore generally in the form of mixtures of the corresponding isomers.

The coupling reaction is followed—before or after first isolating the coupling product—by conversion, if desired by introduction of the cations $M^{\oplus 1}$ to $M^{\oplus 6}$, into the desired salt or acid form.

The compounds of the general formula V can be obtained in a manner known per se by the coupling reaction of 1-amino-8-hydroxynaphthalene-3,6-disulphonic acid or its monosodium salt (H acid) with two equivalents of a 4-nitrobenzenediazonium salt, obtained by diazotization of a 4-nitroaniline derivative, to give the compound of the

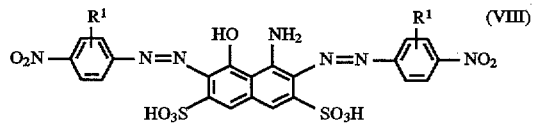

in which $R^1$ is as defined above, followed by a reduction of the nitro groups in the compound of the general formula VIII to amino groups, for example using sodium sulphide as reducing agent. Examples of suitable nitroaniline derivatives are 4-nitroaniline, 2-methyl-4-nitroaniline, 2-ethyl-4-nitroaniline, 3-methyl-4-nitroaniline and 3-ethyl-4-nitroaniline.

The compounds of the general formula VII can be obtained by alkylating compounds of the general formula IX

in which $R^2$ is as defined above with compounds of the general formula X

in which $R^3$ and $R^{3'}$ and n are as defined above and X is chlorine, bromine or iodine, or salts thereof. This reaction is preferably carried out in an aqueous reaction medium at a pH of from 3 to 8, particularly preferably from 5 to 8, and at temperatures from 40° to 140° C., particularly preferably from 80° to 120° C. The resulting compounds of the general formula VII and their salts are preferably employed, without intermediate isolation, as an aqueous solution in the reaction with the compounds of the general formula VI.

Examples of suitable compounds of the general formula IX are 3-aminophenol, 3-amino-4-methylphenol, 3-amino-5-methylphenol, 5-amino-2-methyl phenol, 3-amino-4-chlorophenol and 3-amino-4-ethyl phenol. 3-Aminophenol is particularly preferred.

Examples of suitable compounds of the general formula X are monochloroacetic acid, monobromoacetic acid, 2-chloropropionic acid, 2-bromopropionic acid, 3-chloropropionic acid, 3-bromopropionic acid and salts thereof, with preference being given to monochloroacetic acid and sodium monochloroacetate.

The tetrakisazo compounds according to the invention of the general formula I can, after the coupling reaction, be precipitated by the addition of mineral acids, for example hydrochloric or sulphuric acid, in the form of the sparingly soluble, free dye acids of the general formula Ia

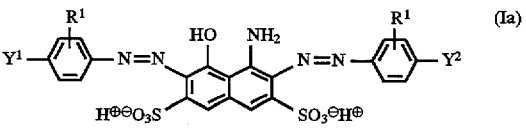

in which

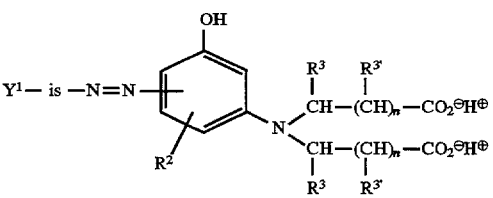

and

-continued

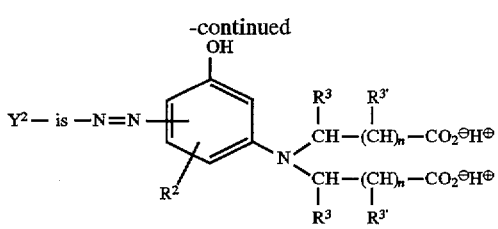

and in which $R^1$, $R^2$, $R^3$, $R^{3'}$ and n have the meanings given above. The dye acids of the general formula Ia can be isolated conventionally, for example by filtration or centrifugation, and can be freed from inorganic salts by washing with water or acidified water. The low-salt dye acid thus obtained can then be neutralized, for example in an aqueous medium, using bases such as suitable metal hydroxides and/or metal carbonates, examples being lithium hydroxide, lithium carbonate, sodium hydroxide, sodium hydrogen carbonate, sodium carbonate, potassium hydroxide or potassium carbonate, and/or ammonia and/or amines and/or ammonium hydroxides, and converted to the desired compound of the general formula I. At this point it is also possible to add two or more bases in order to obtain compounds of the general formula I having different cations $M^{\oplus 1}$ to $M^{\oplus 6}$. The bases can be added in solid, liquid or dissolved form and are preferably employed in their customary commercial form.

Examples of compounds suitable for preparing water-soluble tetrakisazo dyes of the general formula I according to the invention are, in addition to the lithium, sodium and potassium compounds cited by way of example and ammonia, the following amines and ammonium hydroxides and mixtures thereof with one another or with the inorganic bases mentioned: methylamine, ethylamine, propylamine, isopropylamine, n-butylamine, isobutylamine, sec-butylamine, dimethylamine, diethylamine, dipropylamine, diisopropylamine, trimethylamine, ethanolamine, diethanolamine, triethanolamine, allylamine, 2-dimethylaminoethylamine, 3-diethylaminopropylamine, dibutyl(2-hydroxyethyl)amine, ethylenediamine, 1,2-diaminopropane, 1,3-diaminopropane, 1-amino-2-hydroxypropane, 1-amino-2,3-dihydroxypropane, 1-dimethylamino-2,3-dihydroxypropane, N-methyl-N,N-bis(2-hydroxyethyl)amine, N-(2-(2-hydroxyethoxy)ethyl)amine, N,N-bis(2-(2-hydroxyethoxy)ethyl)amine, N,N,N-tris(2-(2-hydroxyethoxy)ethyl)amine, diethylenetriamine, triethylenetetramine, pyridine, pyrrolidine, N-methylpyrrolidine, N-(2-hydroxyethyl)pyrrolidine, piperidine, N-(2-hydroxyethyl)piperidine, morpholine, N-(2-hydroxyethyl)morpholine and tetramethylammonium hydroxide.

Examples of compounds suitable for preparing alcohol-soluble tetrakisazo dyes of the general formula I according to the invention are the following amines or mixtures thereof: isoheptylamine, n-octylamine, isooctylamine, tert-octylamine, 2-ethylhexylamine, 1,1,3,3-tetramethylbutylamine, 1,5-dimethylhexylamine, 1-methylheptylamine, nonylamine, isononylamine, 3,5,5-trimethylhexylamine, decyclaminedodecylamine, hexadecylamine, 3-(2-ethylhexyloxy) propylamine and 3-(isononyloxy)propylamine.

To prepare alcohol-soluble tetrakisazo compounds of the general formula I according to the invention it is also possible to react the compounds obtained, according to the above preparation process, initially in the form of the alkali metal salts—for example in an aqueous medium—with alkyl ammonium salts which contain ammonium cations of the general formula IV and, as counterion, chloride or sulphate, for example. These reactions preferably take place at a pH of from 4 to 8, particularly preferably at a pH of from 5 to 7. The tetrakisazo compounds of the general formula I which are obtained by this cation exchange and in which $M^{\oplus 1}$ to $M^{\oplus 6}$ are ammonium cations of the general formula IV can be isolated from the aqueous reaction medium, owing to their low solubility in water, in a simple manner, for example by filtration or centrifugation, and can be washed free from unwanted salts using water.

From the above-described aqueous solutions of the compounds of the general formula I, which solutions can be obtained by reacting the dye acids of the general formula Ia with suitable inorganic and/or organic bases, the dyes can if desired be isolated as solids, for example by adding a precipitant or by concentrating or drying—for example spray-drying—the solution, and can be employed in this solid form in further processing, for example the production of recording liquids. The aqueous solutions described above can also, however, be processed further directly, in order for example to produce recording liquids, in which case the solutions are generally first of all subjected to microfiltration in order to remove insoluble particles and/or to dialysis or ultrafiltration to remove inorganic salts.

The polyazo dyes according to the invention of the general formula I are outstandingly suited to the dyeing and printing of natural and synthetic fibre materials, for example textile materials produced from cotton or polyamide, but especially for the dyeing and printing of leather and paper, specifically acidic grades of paper. Dyeings and prints produced on these materials using the dyes according to the invention are distinguished by particularly good fastness properties, for example water fastness and abrasion fastness.

The soluble tetrakisazo compounds of the general formula I according to the invention, moreover, are particularly and outstandingly suitable for the production of inks and recording liquids, especially those for the ink-jet printing method. In relation to dyes employed for this purpose in the prior art, for example dyes of the general formula II, the dyes according to the invention show surprising advantages, especially in respect of the solubility of the dyes, the tintorial strength and the fastness properties, specifically the wet fastness and abrasion fastness. Recording liquids which comprise one or more of the tetrakisazo compounds of the general formula I produce, especially in the ink-jet printing method, black printed images of excellent quality whose definition and brightness and resistance to light and, in particular, to water and abrasion is very good, especially on weakly acidic grades of paper. In the course of the storage of inks and recording liquids produced with soluble tetrakisazo compounds of the general formula I as dyes, even when such storage is prolonged, there is no deposition of crystals which can lead to blockage of nozzles and to printed images which lack definition. The storage stability is substantially better with the dyes according to the invention than with the comparable dyes of the prior art.

The dyes according to the invention of the general formula I have advantages over those of the prior art from the toxicological standpoint as well. The present invention additionally relates to inks and recording liquids which are characterized in that they comprise one or more soluble tetrakisazo compounds of the general formula I. The production of such recording liquids takes place by methods which are known per se, and information on compositions, especially the compositions of inks for the jet printing method, can be found, for example, in DE-A-21 32 324, DE-A-21 60 475, U.S. Pat. Nos. 4,024,096, 4,024,397 and 4,070,322. The precise composition of the recording liquid is of course matched to the intended use.

The finished recording liquids generally contain a total of from 0.5 to 15% by weight (calculated on a dry basis) of one or more soluble dyes of the general formula I, from 0 to 99% by weight of water and from 0.5 to 99.5% by weight of solvents and/or humectants. In a preferred embodiment, the finished recording liquids contain from 0.5 to 15% by weight of dye (calculated on a dry basis), from 40 to 85% by weight of water and from 10 to 50% by weight of solvents and/or humectants; in another preferred embodiment they contain from 0.5 to 15% by weight of dye (calculated on a dry basis), from 0 to 20% by weight of water and from 70 to 99.5% by weight of solvents and/or humectants. In general, the finished recording liquids also contain other additives, which are mentioned below.

Water used to produce the recording liquids is preferably employed in the form of distilled or deionized water. The solvent and/or humectant present in the recording liquids can be an organic solvent or a mixture of such solvents, and in this context it is preferred to employ water-soluble solvents. Examples of suitable solvents are mono- and polyhydric alcohols, their ethers and esters, for example alkanols, especially with 1 to 4 carbon atoms, such as, for example, methanol, ethanol, propanol, isopropanol, butanol, isobutanol and tert-butanol; di- and trihydric alcohols, especially those with 2 to 6 carbon atoms, for example ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol; polyalkylene glycols, for example triethylene glycol, polyethylene glycol, tripropylene glycol, polypropylene glycol; lower alkyl ethers of polyhydric alcohols, for example ethylene glycol monomethyl or -ethyl or -propyl or -butyl ether, diethylene glycol monomethyl or -ethyl ether, or triethylene glycol monomethyl or -ethyl ether; ketones and keto alcohols, especially those with 3 to 7 carbon atoms, examples being acetone, methyl ethyl ketone, diethyl ketone, methyl isobutyl ketone, methyl pentyl ketone, cyclopentanone, cyclohexanone and diacetone alcohol; ethers, for example dibutyl ether, tetrahydrofuran and dioxane; esters, for example ethyl formate, methyl formate, methyl acetate, ethyl acetate, propylene acetate, butyl acetate, phenyl acetate, ethylene glycol monoethyl ether acetate and 2-hydroxyethyl acetate; amides, for example dimethylformamide, dimethylacetamide and N-methylpyrrolidone; and also urea, tetramethylurea and thiodiglycol.

Of the substances mentioned above, some act not only as solvents but also reveal other properties. For example, the polyhydric alcohols also act as humectants.

In addition, the recording liquids can comprise customary additives, for example preservatives such as phenol derivatives, cationic, anionic or nonionic surface-active substances (wetting agents), and agents for regulating the viscosity, for example polyvinyl alcohol, cellulose derivatives, or water-soluble natural or synthetic resins as film-formers or binders in order to increase the adhesion and resistance to abrasion.

Amines such as, for example, ethanolamine, diethanoiamine, triethanolamine, N,N-dimethylethanolamine and diisopropylamine are used principally in order to increase the pH of the recording liquid. They are generally present in the recording liquid in a proportion of from 0 to 10% by weight, preferably from 0.5 to 5% by weight.

In the case of recording liquids for the ink-jet printing method it is also possible, depending on the embodiment of this printing method, for example as a continuous jet, intermittent jet, impulse jet or compound jet method, to add—if required—other additives, for example in order to buffer the pH and to adjust the electrical conductivity, the specific heat, the coefficient of thermal expansion.

The recording liquids can be prepared in a simple manner by mixing the components, which can be carried out for example by dissolving one or more dyes of the general formula I in water and/or solvent, or else in such a way that an aqueous solution obtained in the course of preparing the dye of the general formula I is diluted to the desired extent, after appropriate preparation if desired, and that further components such as water, solvents, additives, etc., are then admixed.

The recording liquids containing one or more dyes of the general formula I are outstandingly suitable for use in printing, duplicating, marking, writing, drawing, stamping or recording processes, but also and especially in the ink-jet printing method. In this context, black prints are obtained which are of high quality and possess high definition and brightness and also good resistance to water, light and abrasion. In relation to comparable dyes, the dyes of the general formula I according to the invention are of greater solubility in water and have enhanced water fastness, especially on weakly acidic grades of paper. They are also advantageous from a toxicological standpoint.

When inks according to the invention are stored, there is no deposition of precipitates; in addition, in ink-jet printing using inks according to the invention, no blockage occurs in the nozzles. Nor do any changes in the physical properties of inks according to the invention occur when they are employed for prolonged periods in an ink-jet printer with continuous recirculation or intermittently with the ink-jet printer being switched off in the interim.

EXAMPLE 1 a) Preparation of N-(3-hydroxyphenyl)iminodiacetic acid, disodium salt 21.8 g of 3-aminophenol are introduced into 50 ml of water and heated to 90° C. A solution of 47.7 g of sodium monochloroacetate in 75 ml of water is then added, the pH of the reaction mixture being maintained at from 6.5 to 7 by addition of 28.5 g of sodium hydrogen carbonate. In order to complete the alkylation reaction, the mixture is subsequently stirred at from 90° to 95° C. for 4 hours. The solution obtained can be processed further without intermediate isolation of the N-(3-hydroxyphenyl)iminodiacetic acid obtained.

b) Preparation of the dye 13.9 g of sodium nitrite are added to 60.2 g of the bisazo dye of the formula Va

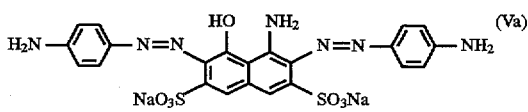

which is obtained in a customary manner by diazotizing 27.8 g of 4-nitroaniline and coupling the resulting 4-nitrobenzenediazonium chloride with 31.9 g of H acid (1-amino-8-hydroxynaphthalene-3,6-disulphonic acid, monosodium salt) followed by sulphide reduction of the nitro groups, this dye being in the form of a 45% strength by weight aqueous solution at a pH of from 7.5 to 8. This solution is added over 30 minutes to a mixture of 99.0 g of 30% strength by weight hydrochloric acid, 100 ml of water and 100 g of ice. During the addition, the temperature is held at from 0° to 5° C. by adding 300 g of ice. The mixture is subsequently stirred at from 0° to 5° C. for 3 hours and then excess nitrous acid is removed with amidosulphonic acid.

The suspension of the bisdiazonium salt obtained is added over the course of 1 hour to a mixture of the aqueous solution of N-(3-hydroxyphenyl)iminodiacetic acid disodium salt prepared according to a), 35.0 g of sodium carbonate and 150 g of ice.

After completion of the coupling reaction and addition of 75.0 g of 30% strength by weight hydrochloric acid to a pH of 2, the dye acid precipitated is isolated by filtration and washed free of electrolyte using water.

The dye acid obtained is subsequently stirred in 500 ml of water and neutralized with lithium hydroxide (pH 7 to 7.5). Drying of the dye solution obtained gives 107.9 g of the black tetrakisazo dye of the formula I with $R^1$, $R^2$ and $R^3$=hydrogen, n=0 and $M^{\oplus 1}$ to $M^{\oplus 6}$=Li$^\oplus$. Absorption spectrum of the dye in water: $\lambda_{max}$=632 nm.

The tetrakisazo dye obtained exhibits excellent tinctorial strength, solubility and water fastness.

EXAMPLE 2

The procedure of Example 1 is followed and, after completion of the coupling reaction, 800 ml of a 0.5 molar aqueous solution of 3-(2-ethylhexyloxy)propylammonium chloride are added to the aqueous solution at a pH of 6. The precipitated product is isolated by filtration, washed free of salt using water and dried.

Yield: 152.7 g of black tetrakisazo dye of the formula I with $R^1$, $R^2$ and $R^3$=hydrogen, n=0, $M^{\oplus 1}$ to $M^{\oplus 6}$=

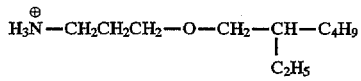

Absorption spectrum of the dye in ethanol: $\lambda_{max}$=634 nm.

The product exhibits outstanding solubility in alcohols and good light fastness and water fastness.

Table 1 lists further tetrakisazo dyes of the general formula I according to the invention which can be prepared in accordance with the instructions in Examples 1 and 2. $R^1$ in these examples is hydrogen.

| Example | coupling component of the general formula VII employed | $M^{\oplus 1}$ to $M^{\oplus 6}$ |
|---|---|---|
| 3 | 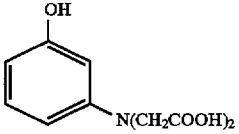 | Na$^\oplus$ |
| 4 | 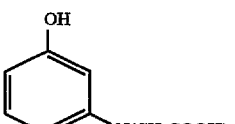 | NH$_4^\oplus$ |
| 5 | 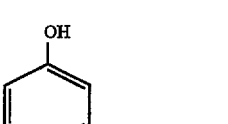 | N$^\oplus$(CH$_3$)$_4$ |
| 6 | 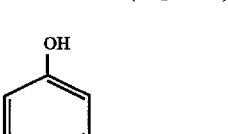 | HN$^\oplus$(CH$_2$CH$_2$OH)$_3$ |
| 7 | 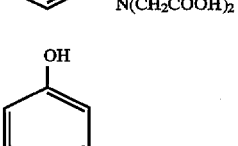 | H$_3$N$^\oplus$—CH$_2$CH$_2$O—CH$_2$CH$_2$OH |

-continued

| Example | coupling component of the general formula VII employed | $M^{\oplus 1}$ to $M^{\oplus 6}$ |
|---|---|---|
| 8 | 3-OH, N(CH$_2$CH$_2$COOH)$_2$ phenyl | $Li^\oplus$ |
| 9 | 3-OH, N—(CH(CH$_3$)COOH)$_2$ phenyl | $Li^\oplus$ |
| 10 | 2-OH, 3-N(CH$_2$COOH)$_2$, 6-CH$_3$ phenyl | $Li^\oplus$ |
| 11 | 3-OH, 4-CH$_3$, 5-N(CH$_2$COOH)$_2$ phenyl | $H_2N^\oplus(CH_2CH_2OH)_2$ |
| 12 | 2-OH, 3-N(CH$_2$COOH)$_2$, 6-Cl phenyl | $Li^\oplus$ |
| 13 | 3-OH, N(CH$_2$COOH)$_2$ phenyl | $H_3N^\oplus$—CH(C$_2$H$_5$)—C$_4$H$_9$ |
| 14 | 3-OH, N(CH$_2$COOH)$_2$ phenyl | $H_3N^\oplus$—C(CH$_3$)$_2$—CH$_2$—C(CH$_3$)$_2$—CH$_3$ |
| 15 | 3-OH, N(CH$_2$COOH)$_2$ phenyl | $H_3N^\oplus$—(CH$_2$)$_6$—CH(CH$_3$)$_2$ |
| 16 | 3-OH, N(CH$_2$COOH)$_2$ phenyl | $H_3N^\oplus$—(CH$_2$)$_3$—O—(CH$_2$)$_6$—CH(CH$_3$)$_2$ |
| 17 | 3-OH, N(CH$_2$COOH)$_2$ phenyl | $H_3N^\oplus$—CH$_2$CH$_2$—CH(CH$_3$)—CH$_2$—C(CH$_3$)$_3$ |

EXAMPLE 18

A recording liquid with the following formulation is prepared by mixing the components:

4% by weight dye according to Example 1,
4% by weight triethanolamine,
77% by weight distilled water,
15% by weight diethylene glycol.

We claim:

1. A tetrakisazo compound of the formula I

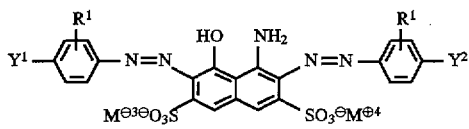

in which

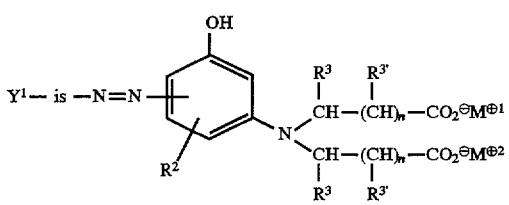

and

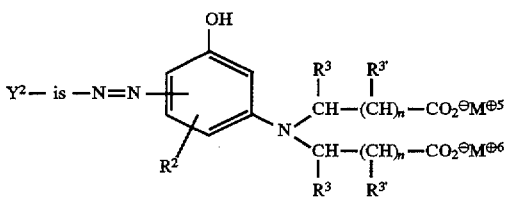

and $R^1$ is hydrogen or $(C_1-C_4)$-alkyl;

$R^2$ is hydrogen, $(C_1-C_4)$-alkyl or halogen;

$R^3$ and $R^{3'}$ independently of one another are hydrogen or $(C_1-C_4)$-alkyl;

$M^{\oplus 1}$, $M^{\oplus 2}$, $M^{\oplus 3}$, $M^{\oplus 4}$, $M^{\oplus 5}$ and $M^{\oplus 6}$ independently of one another are a cation; and n is 0 or 1.

2. A tetrakisazo dye comprising the compound according to claim 1, disolved in a solvent.

3. The compound according to claim 1, wherein $R^1$ and $R^2$ are hydrogen.

4. The compound according to claim 1, wherein $R^3$ and $R^{3'}$ independently of one another are hydrogen or methyl.

5. The compound according to claim 3, wherein $R^3$ and $R^{3'}$ independently of one another are hydrogen or methyl.

6. The compound according to claim 1, wherein $R^1$, $R^2$ and $R^3$ are hydrogen, n is 0 and $M^{\oplus 1}$ to $M^{\oplus 6}$ are identical.

7. The tetrakisazo dye according to claim 2, wherein $R^3$ and $R^{3'}$ independently of one another are hydrogen or methyl.

8. Water-soluble tetrakisazo dye comprising the compound of the formula I according to claim 1, disolved in a solvent, wherein $M^{\oplus 1}$ to $M^{\oplus 6}$ independently of one another are a lithium ion, a sodium ion, a potassium ion, a ammonium ion or an organic ammonium ion of the formula III

in which $R^4$, $R^5$, $R^6$ and $R^7$ independently of one another are hydrogen, unsubstituted $(C_1-C_4)$-alkyl or $(C_1-C_4)$-alkyl which is substituted by one or more hydroxyl or 2-hydroxyethoxy groups.

9. The compound according to claim 1, wherein $M^{\oplus 1}$ to $M^{\oplus 6}$ independently of one another are a lithium ion, a sodium ion, a potassium ion, a ammonium ion or an organic ammonium ion of the formula III

in which $R^4$, $R^5$, $R^6$ and $R^7$ independently of one another are hydrogen, unsubstituted $(C_1-C_4)$-alkyl or $(C_1-C_4)$-alkyl which is substituted by one or more hydroxyl or 2-hydroxyethoxy groups.

10. Alcohol-soluble tetrakisazo dye comprising the compound of formula I according to claim 1, disolved in a solvent, wherein $M^{\oplus 1}$ to $M^{\oplus 6}$ independently of one another are ammonium ions of the formula IV

in which $R^8$ is straight-chain or branched $(C_6-C_{16})$-alkyl or an oxygen atom is inserted between two carbon atoms in the alkyl.

11. The compound according to claim 1, wherein $M^{\oplus 1}$ to $M^{\oplus 6}$ independently of one another are ammonium ions of the formula IV

in which $R^8$ is straight-chain or branched $(C_6-C_{16})$-alkyl or an oxygen atom is inserted between two carbon atoms.

12. The compound according to claim 11, wherein $M^{\oplus 1}$ to $M^{\oplus 6}$ are identical.

13. A process for the preparation of tetrakisazo compounds of the formula I according to claim 1, comprising bis-diazotizing a compound of the formula V on the terminal amino groups,

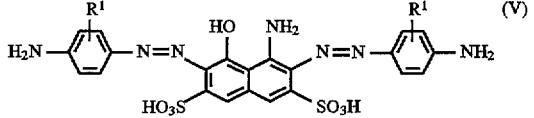

in which $R^1$ is as defined in claim 1, and coupling the resulting bis-diazonium salt onto a compound of the formula VII

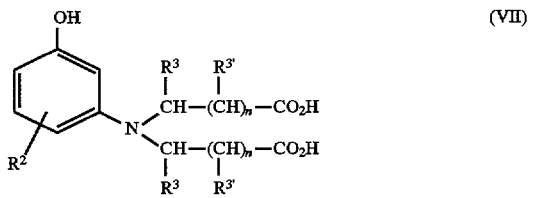

in which $R^2$, $R^3$ and $R^{3'}$ and n are as defined in claim 1, or a salt thereof.

14. The process as claimed in claim 13, wherein the coupling reaction is carried out in an aqueous medium at a pH of about 5 to about 12 and at a temperature of about $-5°$ to about 30° C.

15. A process for the dyeing and printing of natural and synthetic fibre material comprising applying the tetrakisazo dye according to claim 2 onto said material.

16. A process for the production of inks and recording liquids comprising using the tetrakisazo dye according to claim 2.

17. A recording liquid containing in total from about 0.5 to about 15% by weight of one or more soluble dyes according to claim 2, from 0 to about 99% by weight of water and from about 0.5 to about 99.5% by weight of solvents or humectants or mixtures thereof.

18. A recording liquid for the ink-jet printing method, containing in total from about 0.5 to about 15% by weight of one or more soluble dyes according to claim 2, and either from about 40 to about 85% by weight of water and from about 10 to about 50% by weight of solvents or humectants or mixtures thereof or from about 0 to 20% by weight of water and from about 70 to about 99.5% by weight of solvents or humectants or mixtures thereof.

19. The process as claimed in claim 13 further comprising converting the compound of formula VII into a salt or acid form.

* * * * *